July 22, 1969  R. HEINZMANN  3,456,570

EXPOSURE CONTROL FOR PHOTOGRAPHIC CAMERA

Filed Dec. 21, 1966

INVENTOR

Rolf Heinzmann

BY
Michael J. Striker
his ATTORNEY

United States Patent Office 3,456,570
Patented July 22, 1969

3,456,570
EXPOSURE CONTROL FOR PHOTOGRAPHIC CAMERA
Rolf Heinzmann, Stuttgart-Bad Cannstatt, Germany, assignor to Robert Bosch Elektronik und Photokino G.m.b.H., Stuttgart-Unterturkheim, Germany
Filed Dec. 21, 1966, Ser. No. 603,649
Claims priority, application Germany, Dec. 28, 1965, B 85,176
Int. Cl. G03b 9/02
U.S. Cl. 95—64                                    9 Claims

ABSTRACT OF THE DISCLOSURE

An exposure control for photographic cameras wherein the diaphragm comprises two overlapping blades movable with reference to each other by the output member of an exposure meter. One blade is rigid with the output member and the other blade is eccentrically pivoted to the output member. The path of movement of the other blade in response to changes in energization of the exposure meter by scene light is determined by a pin-and-slot connection including a pin fixed to the casing of the camera and a slot provided in the other blade.

Background of the invention

The present invention relates to photographic cameras in general, and more particularly to an improved exposure control for photographic cameras. Still more particularly, the invention relates to improvements in diaphragms of the type comprising two blades and providing a range of exposure apertures in response to rotation of the output member in an exposure meter which is positionable as a function of the intensity of scene light.

It is already known to provide a diaphragm with two blades having overlapping openings which define a range of exposure apertures in response to rotation of a moving coil which forms part of a galvanometer energized by scene light. Such a diaphragm is disclosed, for example, in Austrian Patent No. 231,264 which described a link serving to guide one of the blades in response to rotation of the moving coil. One end of the link is pivotable about a fixed axis which is parallel to the axis of the moving coil and the other end is pivotably connected to the blade. This brings about a number of serious drawbacks, particularly as regards inaccuracies due to excessive friction and excessive space requirements of the diaphragm. In a compact still or movie camera, space is at a premium and, therefore, even minor savings in space by omission of one or more elements (particularly links) can effect considerable reduction in the overall size of the casing. Furthermore, the aforementioned link requires two pivots one of which is provided at the point of connection with the casing and the other of which is provided between the link and the respective blade. Friction produced at such pivot points for the link will affect the quality of exposures because the torque produced by the moving coil of a galvanometer is very small and any unpredictable friction will result in improper selection of the exposure aperture. The weight of the link, too, can cause inaccuracies in selection of the exposure aperture and its inertia reduces the speed of adjustment. Finally, inevitable play between the link and the parts connected therewith will increase with progressing wear upon the pivots and will constitute another factor which affects the accuracy of adjustment.

Accordingly, it is an important object of the present invention to provide a novel and improved exposure control whose diaphragm comprises two relatively movable blades and wherein friction due to necessary guidance of one blade during displacement in response to rotation of the moving coil is reduced to a minimum in a very simple, space-saving and efficient way.

Another object of the invention is to provide a diaphragm of the just outlined character wherein the blade which is articulately coupled to the moving coil of an exposure meter need not be guided by a link and wherein friction resulting from engagement of the articulately coupled blade with its guide means is but a fraction of such friction which develops in presently known diaphragms with two blades.

A further object of the invention is to provide an exposure control which embodies the above outlined diaphragm and wherein accurate guidance of the articulated blade is achieved without necessitating the provision of parts whose inertia must be overcome by the moving coil in response to changes in the intensity of scene light.

A concomitant object of the invention is to provide a diaphragm with two blades which can furnish an infinite number of different exposure apertures.

An ancillary object of the invention is to provide very simple, compact and inexpensive guide means for the articulated blade of a two-blade diaphragm which is adjustable by an exposure meter.

A further object of the invention is to provide an adjustable diaphragm with two blades which can react in response to exceptionally small changes in intensity of scene light so that the camera using such a diaphragm will be able to make highly satisfactory exposures.

Brief summary of the invention

The invention is embodied in an exposure control for still cameras or movie cameras. The exposure control comprises an exposure meter, preferably a galvanometer type exposure meter energizable by scene light and having a rotary output member which is positionable as a function of the intensity of such light, an adjustable diaphragm having a range of exposure apertures and including a first blade fixed to and rotatable with the output member and a second blade eccentrically pivoted to the output member, and guide means comprising a pair of cooperating portions respectively provided on the second blade and on the casing of the camera to determine the path of movement of the second blade in response to rotation of the output member.

The guide means is preferably constituted by a pin-and-slot connection between the second blade and the casing. For manufacturing reasons, the slot is preferably provided in an intermediate portion of the second blade and accommodates a follower pin which is attached to the casing.

Each of the two blades has an outer end portion which is remote from the output member of the exposure meter and such outer end portions are provided with openings which overlie each other to define an exposure aperture whose size varies in response to rotation of the output member to and from a neutral position in which the pivot axis of the second blade is preferably located at the level of the axis of the output member and the center of gravity of the second blade is in vertical alignment with the pivot axis.

Brief description of the drawing

The novel features which are considered as characteristic of the invention are set forth in particular in the appended claims. The improved exposure control itself, however, both as to its construction and its mode of operation, together with additional features and advantages thereof, will be best understood upon perusal of the following detailed description of a specific embodiment with reference to the accompanying drawing, in which:

Detailed description of preferred embodiments

Figure 1:
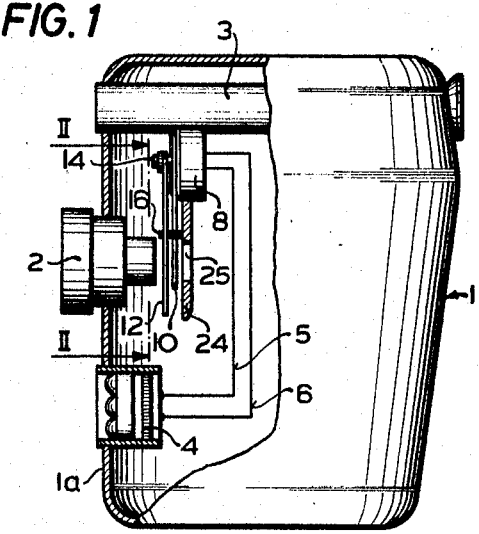
FIG. 1 is a side elevational view of a movie camera comprising an exposure control which embodies my invention, a portion of the camera casing being shown in section.

FIG. 1 illustrates a movie camera having a casing 1 whose front wall 1a carries an objective 2, the front end of a view finder 3, and a photoelectric cell 4 which is energizable by scene light. Electric current generated by cell 4 flows through conductors 5, 6 which connect the cell in circuit with the output member 7 of an exposure meter 8 here shown as a galvanometer whose output member is constituted by a coil rotatable about a horizontal shaft 7a. The output member 7 is rigidly connected with the plate-like upper end portion 9 of a first diaphragm blade 10 having an outer or lower end portion 9a provided with a substantially sickle-shaped opening 22. The end portions 9, 9a are connected to each other by an intermediate portion or arm 11. The diaphragm which includes the blade 10 has a range of exposure apertures and further includes a second blade 12 which is eccentrically pivoted to the output member 7 (and more particularly to the upper end portion 9 of the blade 10) by a pivot pin 14 parallel to the shaft 7a. The lower or outer end portion 12a of the second blade 12 has an opening 23 which tapers upwardly, as viewed in FIG. 2, and overlies the opening 22 of the first blade 10. The overlying portions of the openings 22, 23 define an exposure aperture whose maximum size is indicated by broken lines, as at 26. An elongated intermediate portion or arm 13 connects the lower end portion 12a of the blade 12 with the pivot pin 14.

In accordance with an important feature of my invention, the path of movement of the second blade 10 in response to rotation of the output member 7 is determined by novel guide means including a fixed portion carried by the casing 1 and a movable portion which is constituted by the intermediate portion 13 of the blade 10. In the illustrated embodiment, the intermediate portion 13 is provided with an elongated arcuate guide slot 15 and an internal partition or wall 24 of the casing 1 carries a follower pin 16 which extends into the slot 15. The openings 22, 23 of the blades 10, 12 are located behind the objective 2 so that the light rays can pass through the exposure aperture and through a window 25 in the partition 24, the latter being located in front of the photographic film which is advanced stepwise by a suitable claw pull-down or other transporting mechanism of conventional design. The partition 24 further supports the exposure meter 8. In the illustrated embodiment, the guide means including the follower pin 15 and the slotted intermediate portion 13 are arranged to guide the lower end portion 12a of the second blade 12 in a substantially vertical direction when the camera is held in normal position.

Figure 2:
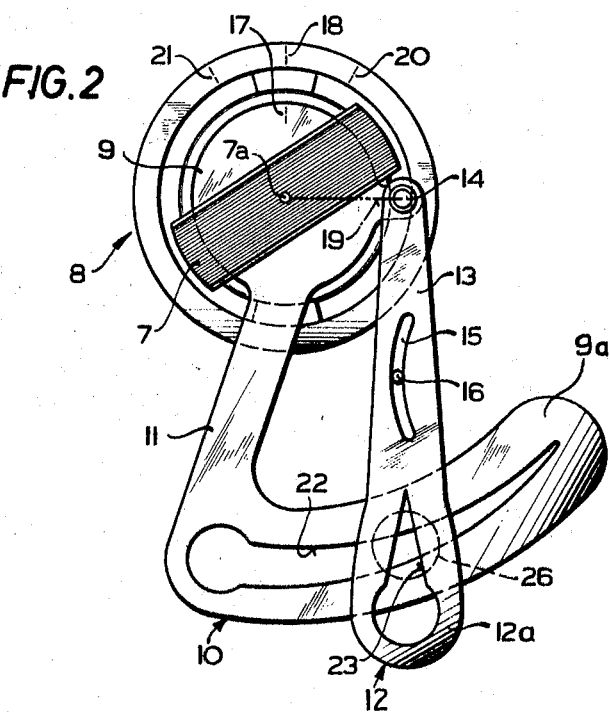
FIG. 2 is an enlarged front elevational view of the exposure meter and diaphragm, substantially as seen in the direction of arrows from the line II—II of FIG. 1.

FIG. 2 illustrates the output member 7 of the exposure meter 8 in a median or neutral position in which an index 17 on the end portion 9 of the blade 10 registers with a graduation 18 on a scale provided on the housing of the exposure meter. The center of gravity of the second blade 12 is then in vertical alignment with the axis of the pivot pin 14. The line 19 connecting the axis of the shaft 7a with the axis of the pivot pin 14 is then located in a horizontal plane, i.e., the pin 14 is located substantially at the level of the shaft 7a, it being assumed that the casing 1 is held in its normal position in which the optical axis of the objective is located in a horizontal plane. The follower pin 16 is then accommodated substantially midway between the ends of the arcuate slot 15. This insures that friction between the follower pin 16 and the surfaces bounding the slot 15 remains negligible while the output member 7 oscillates between its two end positions indicated by graduations 20 and 21. Such minimal friction is due to the fact that rotary movement of the output member 7 produces a substantially vertical linear displacement of the second blade 12 on which is superimposed a very small pivotal movement caused by the arcuate path of movement of the pivot pin 14. Such pivotal movement of the pin 14 is compensated for by the arcuate shape of the slot 16.

The center lines of the tapering openings 22, 23 in the blades 10, 12 make an angle of approximately 90 degrees and intersect each other on the optical axis of the objective 2. This insures a very satisfactory shape of the exposure aperture.

The blades 10, 12 will remain in the positions shown in FIG. 2 as long as the cell 4 supplies a constant current. If the intensity of light reaching the cell 4 increases, the strength of current flowing in the conductors 5, 6 and exposure meter 8 also increases and the output member 7 leaves its neutral position to turn in a clockwise direction. The blade 10 turns in the same direction and the blade 12 moves downwardly to reduce the size of the exposure aperture. If the intensity of scene light decreases, the output member 7 begins to turn in a counterclockwise direction, as viewed in FIG. 2, and the size of the exposure aperture increases because the blade 12 moves upwardly and the blade 10 turns in a counterclockwise direction. The exposure aperture attains a maximum size (26) when the index 17 of the output member 7 registers with the graduation 21. The extent of relative movement between the blades 10 and 12 can be influenced by appropriate selection of the distance between the shaft 7a and pivot pin 14 (line 19) and the angular position of the pin 14 with reference to the index 17. The line 19 indicates the eccentricity of the blade 12 with reference to the axis of the output member 7.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is set forth in the appended claims.

I claim:

1. In a photographic camera having a casing, an exposure control comprising an exposure meter energizable by scene light and having a rotary output member positionable as a function of the intensity of such light; an adjustable diaphragm having a range of exposure apertures and including a first blade fixed to and rotatable with said output member and a second blade eccentrically pivoted to said output member; and guide means comprising a pair of cooperating portions respectively provided on said second blade and said casing to determine the path of movement of said second blade in response to rotation of said output member, one portion of said guide means having an elongated guide slot and the other portion of said guide means comprising a follower slidable in said guide slot.

2. An exposure control as defined in claim 1, wherein said one portion of the guide means is provided on said second blade and said follower is a pin mounted on said casing.

3. An exposure control as defined in claim 1, wherein said exposure meter is a galvanometer having a moving coil which constitutes said output member, said first blade having a plate-like end portion fixed to said moving coil and said second blade being pivoted to said moving coil by a pin secured to said end portion of the first blade.

4. An exposure meter as defined in claim 3, further comprising a photoelectric cell energizable by scene light and connected in circuit with said moving coil.

5. In a photographic camera having a casing, an exposure control comprising an exposure meter energizable by scene light and having a rotary output member positionable as a function of the intensity of such light; an adjustable diaphragm having a range of exposure apertures and including a first blade fixed to and rotatable with said output member and a second blade eccentrically pivoted to said output member, each of said blades having an end portion remote from said output member and said end portions having openings which overlie each other to define an exposure aperture whose size varies in response to rotation of said output member; and guide means provided intermediate said output member and the end portion of said second blade and comprising a pair of cooperating portions respectively provided on said second blade and said casing to determine the path of movement of said second blade in response to rotation of said output member.

6. In a photographic camera having a casing, an exposure control comprising an exposure meter energizable by scene light and having a rotary output member positionable as a function of the intensity of such light, said output member being rotatable to and from a neutral position; an adjustable diaphragm having a range of exposure apertures and including a first blade fixed to and rotatable with said output member and a second blade eccentrically pivoted to said output member by a pin which is located substantially at the level of the axis of rotation of said output member in neutral position; and guide means comprising a pair of cooperating portions respectively provided on said second blade and said casing to determine the path of movement of said second blade in response to rotation of said output member.

7. An exposure control as defined in claim 6, wherein the center of gravity of said second blade is in vertical alignment with said pin in the neutral position of said output member.

8. In a photographic camera having a casing, an exposure control comprising a galvanometer energizable by scene light and having a rotary coil positionable as a function of the intensity of such light; an adjustable diaphragm having a range of exposure apertures and including a first blade having a plate-like end portion fixed to said coil and a second blade eccentrically pivoted to said coil by a pin secured to said end portion of the first blade; and guide means comprising a slotted intermediate portion of said second blade and a follower pin fixed to the casing and cooperating with said slotted intermediate portion to determine the path of movement of said second blade in response to rotation of said coil.

9. An exposure meter as defined in claim 8, wherein said intermediate portion has an arcuate slot which receives said follower pin and wherein said coil is movable to and from a neutral position in which said follower pin is located substantially midway between the ends of said arcuate slot.

References Cited
UNITED STATES PATENTS

| | | |
|---|---|---|
| 2,999,446 | 9/1961 | Hautmann et al. |
| 3,357,779 | 12/1967 | Suicussaar _____ 352—141 |

FOREIGN PATENTS

| | | |
|---|---|---|
| 652,083 | 11/1962 | Canada. |
| 1,267,225 | 6/1961 | France. |
| 386,711 | 4/1965 | Switzerland. |

NORTON ANSHER, Primary Examiner

JOSEPH F. PETERS, Jr., Assistant Examiner

U.S. Cl. X.R.

95—10; 352—141